(12) United States Patent
Kitamura et al.

(10) Patent No.: US 12,374,884 B2
(45) Date of Patent: Jul. 29, 2025

(54) BACKUP POWER SUPPLY DEVICE

(71) Applicant: FDK CORPORATION, Tokyo (JP)

(72) Inventors: Kenji Kitamura, Tokyo (JP); Shun Mochizuki, Tokyo (JP); Yosuke Saito, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 18/276,695

(22) PCT Filed: Feb. 7, 2022

(86) PCT No.: PCT/JP2022/004664
§ 371 (c)(1),
(2) Date: Aug. 10, 2023

(87) PCT Pub. No.: WO2022/172886
PCT Pub. Date: Aug. 18, 2022

(65) Prior Publication Data
US 2024/0128747 A1    Apr. 18, 2024

(30) Foreign Application Priority Data
Feb. 12, 2021   (JP) ................... 2021-021019

(51) Int. Cl.
*H02J 1/08*    (2006.01)
*H02J 7/00*    (2006.01)
*H02J 7/34*    (2006.01)

(52) U.S. Cl.
CPC ............ *H02J 1/084* (2020.01); *H02J 7/0068* (2013.01); *H02J 7/00712* (2020.01); *H02J 7/34* (2013.01)

(58) Field of Classification Search
CPC ...... H02J 1/084; H02J 7/0068; H02J 7/00712; H02J 7/34; H02J 7/00; H02J 7/06; H02J 9/06
See application file for complete search history.

(56) References Cited

U.S. PATENT DOCUMENTS

2012/0235491 A1*   9/2012   Nakashima ............... H02J 7/35
                                                     307/66
2022/0263323 A1*   8/2022   Hakushima ........... B60R 16/033

OTHER PUBLICATIONS

International Search Report for International Application No. PCT/JP2022/004664; Date of Mailing, Mar. 8, 2022.

\* cited by examiner

*Primary Examiner* — Lincoln D Donovan
*Assistant Examiner* — Alex W Lam
(74) *Attorney, Agent, or Firm* — CANTOR COLBURN LLP

(57) ABSTRACT

A backup power supply device includes: a storage battery charged with power from an external power supply; charge switches for charging the storage batter; discharge switches that are made from a field-effect transistor and that discharge the storage battery to a load device; a control unit for controlling the charge switches and the discharge switches; and a discharge suppression section connected in series to the discharge switches. The discharge suppression section suppresses leakage of current from the storage battery only when the control unit charges the storage battery, and the battery voltage exceeds an input voltage and the difference voltage between the battery voltage and the input voltage is less than a prescribed value.

3 Claims, 2 Drawing Sheets

BACKUP POWER SUPPLY DEVICE

CROSS REFERENCE TO RELATED APPLICATIONS

This is the U.S. national stage of application No. PCT/JP2022/004664, filed on Feb. 7, 2022. Priority under 35 U.S.C. § 119 (a) and 35 U.S.C. § 365(b) is claimed from Japanese Application No. 2021-021019, filed Feb. 12, 2021, the disclosure of which is also incorporated herein by reference.

TECHNICAL FIELD

The present invention relates to a backup power supply device for a load apparatus that operates by power supply from an external power supply apparatus.

BACKGROUND ART

Conventionally, as illustrated in FIG. 1, backup power supply device 1 includes, for example, input/output section 4 connected to a power line between load apparatus 2 and power supply apparatus 3, battery charging power supply 5, storage battery 6, charge switches 51 and S2 disposed between battery charging power supply 5 and storage battery 6, discharge switches S3 and S4 for discharging from storage battery 6 toward input/output section 4, and control section 7 for controlling charging and discharging of storage battery 6. Charge switches 51 and S2 include two field effect transistors (FETs) connected in series, and the two FETs are connected such that the polarities of their body diodes are opposite to each other. Discharge switches S3 and S4 also include two FETs, and the two FET are connected in series so that the polarities of their body diodes are opposite to each other.

When charging storage battery 6, control section 7 closes charge switches 51 and S2 and opens discharge switches S3 and S4. On the other hand, when storage battery 6 is discharged, charge switches 51 and S2 are opened and discharge switches S3 and S4 are closed, and power is supplied to load apparatus 2 via input/output section 4.

SUMMARY OF INVENTION

Technical Problem

In power supply apparatus 1 illustrated in FIG. 1, while storage battery 6 is being charged, both of the two FETs constituting discharge switches S3 and S4 are turned off to shut off a discharge path from storage battery 6. In the case where storage battery 6 includes a nickel-metal hydride battery cell, and in order that storage battery 6 is fully charged, storage battery 6 needs to be charged until the battery voltage reaches a full charge voltage value higher than the nominal voltage of storage battery 6. However, when the battery voltage becomes higher than an input voltage to apparatus 1 during charging of storage battery 6, electrical current may leak from storage battery 6 under charge.

In view of the above problem, an object of the present invention is to provide a backup power supply device that suppresses current leakage from a storage battery under charge with a small number of components.

Solution to Problem

In order to achieve the above object, a backup power supply device of the present invention is a backup power supply device used for a load apparatus to which power is supplied from an external power supply apparatus, the backup power supply device including: a storage battery charged by the power from the external power supply apparatus; a charge switch for charging the storage battery; a discharge switch consisting of a field effect transistor and causing the storage battery to discharge toward the load apparatus; a control section that controls the charge switch and the discharge switch, and detects an input voltage from the external power supply apparatus and a battery voltage of the storage battery; and a discharge suppression section connected in series with the discharge switch, in which only when the control section turns on the charge switch and turns off the discharge switch to charge the storage battery and when the battery voltage is higher than the input voltage and a difference voltage between the battery voltage and the input voltage is less than a predetermined value, the discharge suppression section suppresses a discharge leaking from the storage battery via the discharge switch.

According to the above configuration, even when the battery voltage becomes higher than the input voltage during charging of the storage battery, leakage of current from the storage battery is suppressed.

Advantageous Effects of Invention

According to the backup power supply device of the present invention, leakage of current from the storage battery during charging of the storage battery is suppressed with a small number of components. Therefore, the backup power supply device can be manufactured at low cost.

DESCRIPTION OF EMBODIMENTS

A backup power supply device according to an embodiment of the present invention will be described below with reference to FIG. 2.

Figure 1:
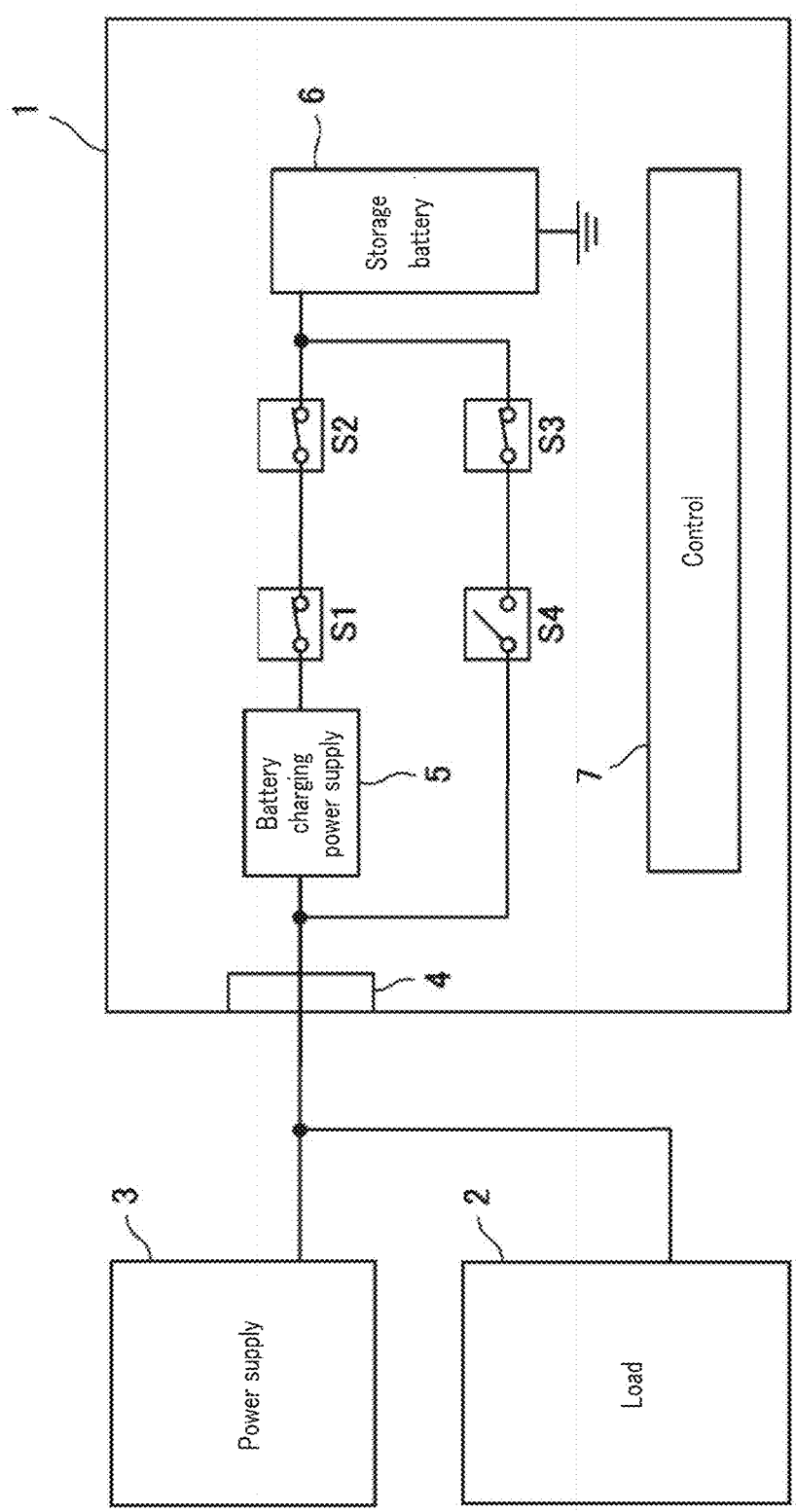
FIG. 1 is a circuit diagram of a conventional backup power supply device.
Figure 2:
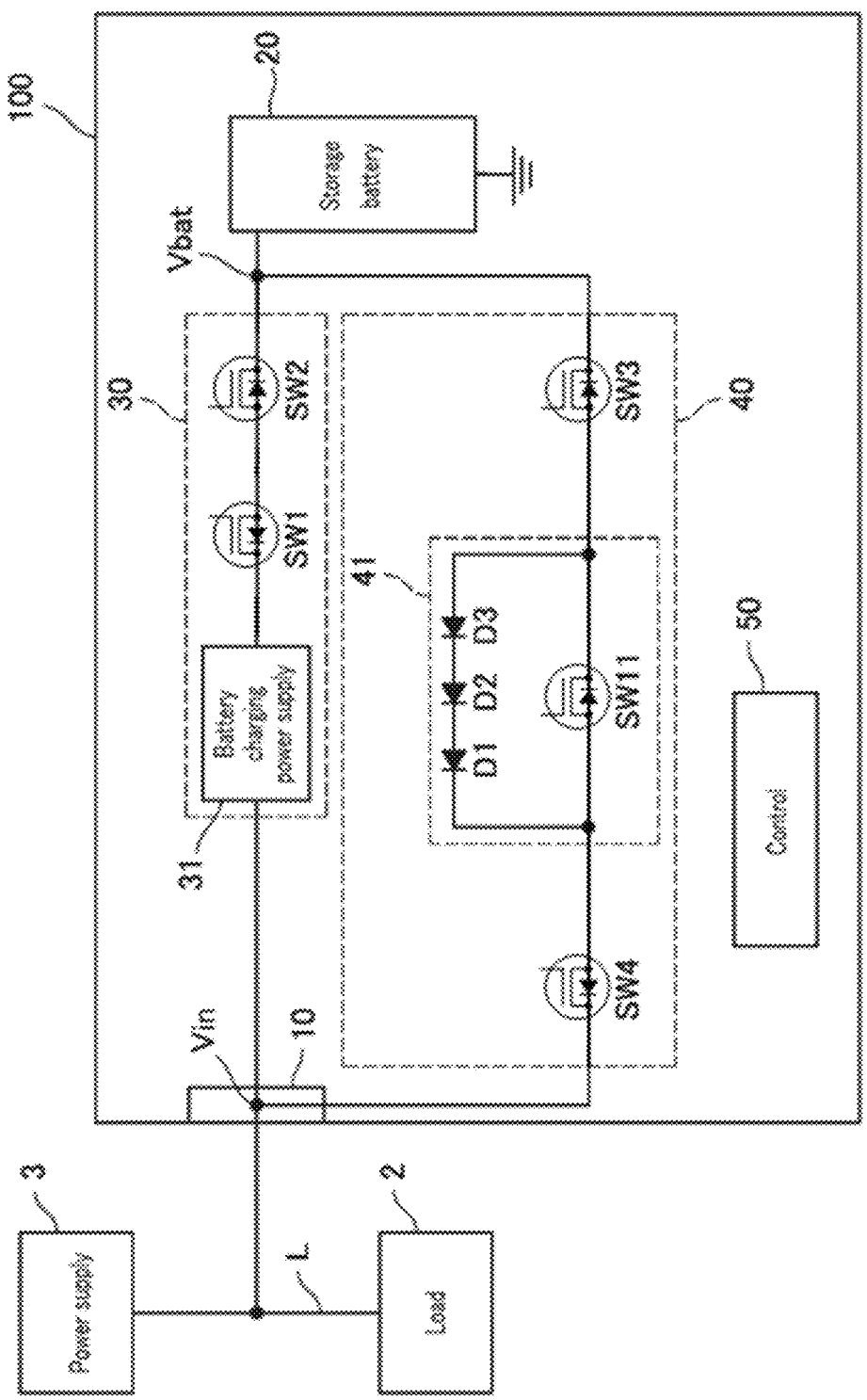
FIG. 2 is a circuit diagram of a backup power supply device according to the present embodiment.

FIG. 2 illustrates backup power supply device 100 according to the present embodiment. Backup power supply apparatus 100 includes input/output section 10, storage battery 20 including a secondary battery, charge circuit 30, discharge circuit 40, and control section 50. In a case where a decrease or interruption of power supplied from external power supply apparatus 3 to load apparatus 2 operated by being supplied with power from external power supply apparatus 3 occurs, the backup power supply device instead of external power supply apparatus 3 supplies power of a nominal voltage to load apparatus 2.

Input/output section 10 is connected to power supply line L that connects external power supply apparatus 3 to load apparatus 2, receives an input of power from external power supply apparatus 3, and outputs power from storage battery 20 to load apparatus 2.

Storage battery 20 includes at least one secondary battery cell such as a nickel-metal hydride battery, for example, and is configured such that an appropriate number of secondary battery cells are connected in series in accordance with a nominal voltage supplied from backup power supply device 100. Storage battery 20 can be discharged after charged.

Charge circuit 30 is disposed between input/output section 10 and storage battery 20, in which battery charging power supply 31 and two switches SW1 and SW2 are connected in series in an order from the input/output section 10 side toward the storage battery 20 side. Battery charging power supply 31 converts input power Vin input to input/output section 10 into power of a voltage and current suitable for charging storage battery 20, and outputs the power to storage battery 20. Two switches SW1 and SW2 include a MOSFET and are connected in series so that the polarities of the body diodes of the respective FETs face away from each other. Two switches SW1 and SW2 are one examples of a charge switch.

Discharge circuit 40 is disposed between storage battery 20 and input/output section 10, in which two switches SW3 and SW4 are connected in series. Each of switches SW3 and SW4 includes a MOSFET. Two switches SW3 and SW4 are connected such that the polarities of the body diodes of FETs face away from each other, and switch SW3 is located on the storage battery 20 side and switch SW4 is located on the input/output section 10 side. For example, the body diode of switch SW3 has an anode located on the input/output section 10 side and a cathode located on the storage battery 20 side, and the body diode of switch SW4 has an anode located on the storage battery 20 side and a cathode located on the input/output section 10 side. Two switches SW3 and SW4 are one examples of a discharge switch.

Further, in discharge circuit 40, discharge suppression circuit 41 is connected in series between switch SW3 and switch SW4. In discharge suppression circuit 41, switch SW11 is connected in parallel with diodes D1, D2, and D3. Switch SW11 includes a MOSFET. The body diode of the MOSFET forming switch SW11 is connected such that an anode is located on the input/output section side and a cathode is located on the storage battery side.

Diodes D1, D2, and D3 include three diodes, and diodes D1, D2, and D3 are connected in series so that anodes are located on the storage battery 20 side and cathodes are located on the input/output section 10 side. Further, each of diodes D1, D2, and D3 has forward voltages VF1, VF2, and VF3. The number of diodes connected in series is set such that a combined value of the forward voltages obtained by all the diodes constituting discharge circuit 40 is equal to or greater than a predicted maximum value of difference voltage $\Delta V$ between battery voltage Vbat and input voltage Vin. Discharge suppression circuit 41 is an example of a discharge suppression section.

Control section 50 includes an input voltage detector (not illustrated) that detects input voltage Vin input to input/output section 10, and a battery voltage detector (not illustrated) that detects battery voltage Vbat of storage battery 20.

Control section 50 controls charge circuit 30 and discharge circuit 40 in accordance with detected input voltage Vin and detected battery voltage Vbat to charge or discharge storage battery 20. When charging storage battery 20, control section 50 turns on two switches SW1 and SW2 of charge circuit 30 to supply storage battery 20 with power outputted from battery charging power supply 31. Control section 50 detects input voltage Vin and battery voltage Vbat while storage battery 20 is being charged. When detecting based on battery voltage Vbat that storage battery 20 is fully charged, control section 50 turns off two switches SW1 and SW2 of charge circuit 30 to end the charging of storage battery 20.

On the other hand, when detecting a decrease falling below a predetermined value of input voltage Vin from external power supply apparatus 3 or detects interruption of the power from external power supply apparatus 3, control section 50 turns on switches SW3 and SW4 of discharge circuit 40, and further turns on switch SW11 of discharge suppression circuit 41 to close a discharge path from storage battery 20 to input/output section 10, and cause storage battery 20 to discharge toward load apparatus 2.

Next, an operation of backup power supply device 100 will be described.

Since input/output section 10 of backup power supply device 100 is connected to power supply line L, storage battery 20 is charged with power from external power supply apparatus 3 and is prepared for reduction or interruption of power from external power supply apparatus 3 to load apparatus 2.

When charging storage battery 20, control section 50 turns on charge switches SW1 and SW2 to close the charge path from input/output section 10 to storage battery 20, turns off discharge switches SW3 and SW4 and switch SW11 of discharge suppression circuit 41 to open the discharge path of storage battery 20. Battery charging power supply 31 outputs power suitable for charging storage battery 20 to storage battery 20 to charge storage battery 20. Control section 50 monitors battery voltage Vbat continuously or at predetermined intervals, determines that storage battery 20 is fully charged when battery voltage Vbat reaches a full charge voltage, turns off charge switches SW1 and SW2, and ends the charging of storage battery 20.

When storage battery 20 includes a nickel-metal hydride battery, battery voltage Vbat sometimes becomes higher than input voltage Vin, because the battery needs to be charged to a voltage higher than the nominal voltage of storage battery 20 in order that storage battery 20 is fully charged. Difference voltage $\Delta V$ between input voltage Vin and battery voltage Vbat generated in this case is dropped by using the sum of forward voltages DF1, DF2, and DF3 of three diodes D1, D2, and D3 connected in series in the discharge path and the forward voltage of the body diode of discharge switch SW4. Due to this voltage drop, the potential of discharge switch SW3 on the storage battery side becomes substantially equal to the battery voltage. Thus, the leakage of the current from storage battery 20 to the discharge path is suppressed. In the present embodiment, difference voltage $\Delta V$ is at most 0.75V. Thus, when the combined value of the forward voltages of the diodes in the discharge path is at least equal to or greater than 0.75V, the leakage of the current from storage battery 20 to the discharge path is not caused.

Control section 50 also monitors input voltage Vin from external power supply apparatus 3 to input/output section 10 continuously or at predetermined intervals. Control section 50 turns on discharge switches SW3 and SW4 and switch SW11 of discharge suppression circuit 41 to close the discharge path from storage battery 20 to input/output section 10 and starts the power supply from storage battery 20 to load apparatus 2 when input voltage Vin falls below the voltage required for the operation of load apparatus 2 supplied with power from external power supply apparatus 3 or when the power supply from external power supply apparatus 3 to load apparatus 2 is interrupted.

In the above-described embodiment, the number of FETs constituting switches SW3, SW4, and SW11 included in discharge circuit 40 is only three. Accordingly, the number of components required for switching control of switches SW3, SW4, and SW11 can be small, and thus an increase in size of backup power supply device 100 can be prevented.

The number of diodes connected in series in discharge suppression circuit 41 may be set in consideration of the forward voltage of each diode and the maximum value of difference voltage ΔV predicted during charging of storage battery 20. The forward voltage of one diode is small. Since the required voltage drop value increases when difference voltage ΔV increases, the number of diodes to be connected in series also needs to increase accordingly.

As described above, difference voltage ΔV generated when battery voltage Vbat becomes higher than input voltage Vin during the charge of storage battery 20 is dropped by using the forward voltages of the diodes connected in series. Therefore, leakage of current from storage battery 20 during charging can be prevented with a simple configuration and at low cost by using diodes which are a passive component. Further, since the diodes are the passive component, it is possible to eliminate the need for a control circuit for the diodes when the diodes are incorporated into a circuit. Therefore, backup power supply device 100 can be manufactured at low cost.

In the above-described embodiment, single switch SW11 is connected in parallel with three diodes D1, D2, and D3 connected in series in discharge suppression circuit 41, but instead of this configuration, a configuration in which a plurality of FETs are connected in series can be adopted. In this case, difference voltage ΔV caused when battery voltage Vbat becomes higher than input voltage Vin during charging of storage battery 20 can be dropped between storage battery 20 and input/output section 10 by using the combined value of the forward voltages of the body diodes of the FETs connected in series. Therefore, leakage of current from storage battery 20 is suppressed.

REFERENCE SIGNS LIST

20 Storage battery
41 Discharge suppression section
50 Control section
100 Backup power supply apparatus
D1, D2, D3 Diode
SW1, SW2 Charge switch
SW3, SW4, SW11 Discharge switch

The invention claimed is:

1. A backup power supply device used for a load apparatus to which power is supplied from an external power supply apparatus, the backup power supply device comprising:
 a storage battery charged by the power from the external power supply apparatus;
 a charge switch for charging the storage battery;
 a discharge switch consisting of a field effect transistor and causing the storage battery to discharge toward the load apparatus;
 a control section that controls the charge switch and the discharge switch, and detects an input voltage from the external power supply apparatus and a battery voltage of the storage battery; and
 a discharge suppression section connected in series with the discharge switch, wherein
 only when the control section turns on the charge switch and turns off the discharge switch to charge the storage battery and when the battery voltage is higher than the input voltage and a difference voltage between the battery voltage and the input voltage is less than a predetermined value, the discharge suppression section suppresses a discharge leaking from the storage battery via the discharge switch.

2. The backup power supply device according to claim 1, further comprising:
 an output section that allows connection from the storage battery to the load apparatus via the discharge switch, wherein
 the discharge suppression section includes a second field effect transistor and a diode connected in parallel to each other,
 the diode has an anode connected to the storage battery side and a cathode connected to the output section side,
 the predetermined value is equal to a forward voltage of the diode, and
 the control section turns off the second field effect transistor when the charge switch is turned on and turns on the second field effect transistor when the discharge switch is turned on.

3. The backup power supply device according to claim 1, further comprising:
 an output section that allows connection from the storage battery to the load apparatus via the discharge switch, wherein
 the discharge suppression section includes a second field effect transistor and a plurality of diodes,
 the plurality of diodes are connected in series to one another such that an anode of each of the plurality of diodes is located on the storage battery side and a cathode of the diode is located on the output section side,
 the plurality of diodes connected in series are connected in parallel with the second field effect transistor,
 the predetermined value is equal to a sum of forward voltages of the plurality of diodes, and
 the control section turns off the second field effect transistor when the charge switch is turned on and turns on the second field effect transistor when the discharge switch is turned on.

\* \* \* \* \*